(No Model.)

W. STODDARD.
PULLEY.

No. 435,160. Patented Aug. 26, 1890.

Witnesses:
J. T. Phillips
W. L. Case

Inventor:
William Stoddard
By A. H. Parkhurst
his atty. in fact

UNITED STATES PATENT OFFICE.

WILLIAM STODDARD, OF SAGINAW, MICHIGAN.

PULLEY.

SPECIFICATION forming part of Letters Patent No. 435,160, dated August 26, 1890.

Application filed June 3, 1889. Serial No. 313,026. (No model.)

*To all whom it may concern:*

Be it known that I, WILLIAM STODDARD, of the city of Saginaw, in the county of Saginaw and State of Michigan, have invented certain new and useful Improvements in Pulleys; and I do hereby declare the following to be a full, clear, and exact description of the invention, such as will enable others skilled in the art to which it pertains to make and use the same.

My invention relates to improvements in pulleys and devices for securing the same in place upon shafting, the primary object being to provide superior pulleys and securing devices adapted to be adjusted and secured upon shafting already put up.

The invention consists in the several features of construction and combinations of devices hereinafter fully described, and pointed out in the claim.

Figure 1:
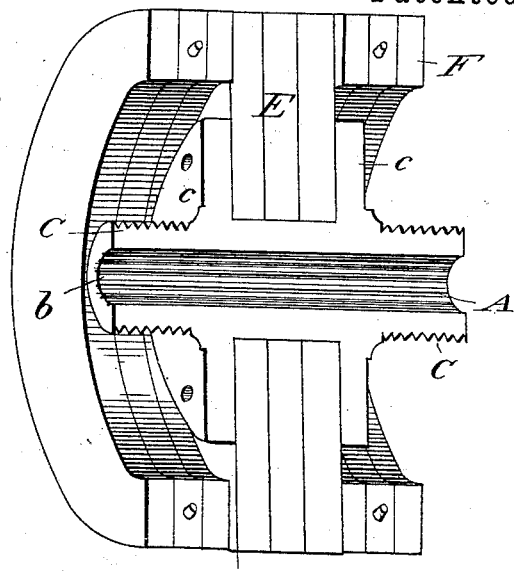
Figure 2:
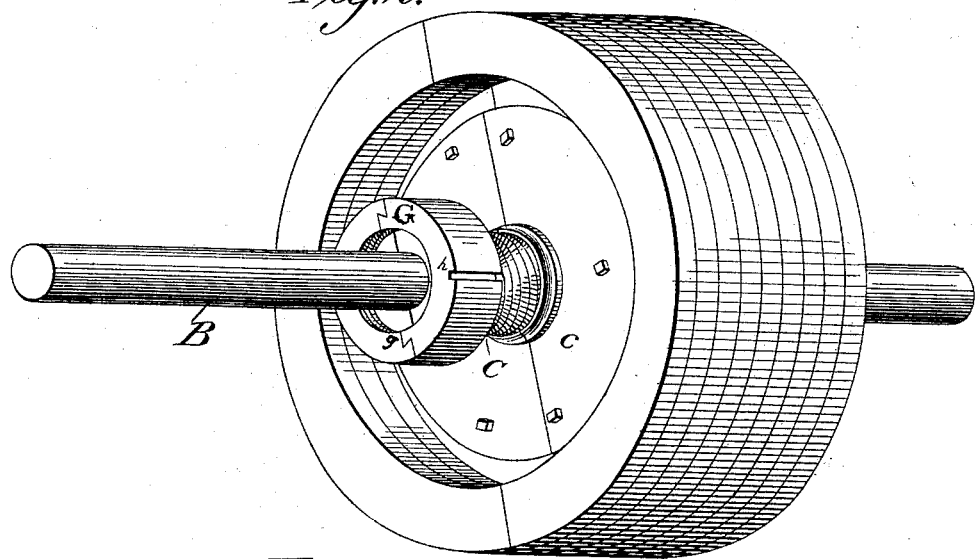
Figure 3:
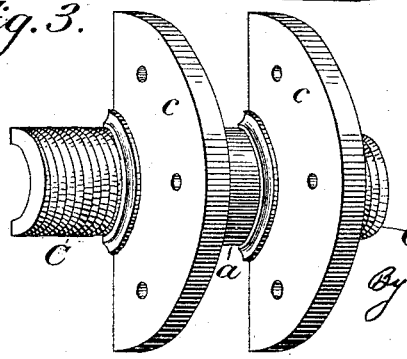

In the drawings, Figure 1 is a sectional view of my improved pulley-sleeve with pulley attached. Fig. 2 is a perspective view of the device complete on a shaft. Fig. 3 is a detail view of one portion of the pulley-sleeve and its flanges.

A represents a cylinder or sleeve, consisting of counterpart sections $a\ a$, each formed with interior longitudinal grooves $b$ to insure a firm grip on the shaft B, and provided with tapering screw-threaded ends C C. The sections $a\ a$ are also provided with parallel flanges $c\ c$, which when the sections are joined form annular flanges, to which the split sections E are secured. The sections E are bolted to the flanges $c\ c$, and their bearing-faces may be increased by applying layers or sections F, as seen in Fig. 1, securing the same by glue, bolts, or other means.

The securing-nuts G (only one being illustrated) consist of two sections, having a dovetail connection $g$, as shown, and interiorly tapered and threaded to fit upon the ends of the sleeve. The nuts are grooved at opposite points $h$ of their periphery to facilitate their being turned by a wrench.

The operation and advantages of the devices above described are apparent, and said devices may be readily applied to or removed from any shafting.

Having fully described my invention, what I claim as new, and desire to secure by Letters Patent, is—

A pulley comprising two continuous counterpart sleeve-sections, each provided with two flanges, which form annular flanges when the sleeve sections are joined, and with tapering screw-threaded ends, pulley-sections resting on the sleeve-sections and secured to the annular flanges, and split nuts, substantially as set forth.

In testimony whereof I have signed this specification in the presence of two subscribing witnesses.

WILLIAM STODDARD.

Witnesses:
   H. PISTORIOUS,
   E. STODDARD.